US008346967B2

(12) United States Patent
Jones

(10) Patent No.: US 8,346,967 B2
(45) Date of Patent: Jan. 1, 2013

(54) MANAGEMENT OF REDIRECTION

(75) Inventor: Gareth Edward Jones, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 973 days.

(21) Appl. No.: 12/239,853

(22) Filed: Sep. 29, 2008

(65) Prior Publication Data
US 2010/0036853 A1 Feb. 11, 2010

(30) Foreign Application Priority Data

Aug. 8, 2008 (EP) .................................... 08162073

(51) Int. Cl.
*G06F 15/16* (2006.01)
(52) U.S. Cl. ......................... 709/245; 709/238; 709/239
(58) Field of Classification Search .................. 709/245, 709/238, 239
See application file for complete search history.

(56) References Cited

U.S. PATENT DOCUMENTS

| | | | |
|---|---|---|---|
| 5,276,458 A | 1/1994 | Sawdon | |
| 7,797,293 B2 | 9/2010 | Pabla et al. | |
| 7,899,792 B2 | 3/2011 | Wakiyama et al. | |
| 7,908,647 B1 | 3/2011 | Polis et al. | |
| 2002/0062241 A1 | 5/2002 | Rubio et al. | |
| 2003/0212712 A1 | 11/2003 | Gu et al. | |
| 2006/0069697 A1* | 3/2006 | Shraim et al. ................. 707/102 | |
| 2006/0186309 A1 | 8/2006 | Lonnqvist | |
| 2006/0195422 A1 | 8/2006 | Cadiz et al. | |
| 2006/0195472 A1 | 8/2006 | Cadiz et al. | |
| 2006/0218630 A1* | 9/2006 | Pearson et al. ..................... 726/8 |
| 2007/0027930 A1 | 2/2007 | Alvarado et al. | |
| 2007/0150603 A1 | 6/2007 | Crull et al. | |
| 2007/0255916 A1 | 11/2007 | Hiraiwa et al. | |
| 2008/0168539 A1 | 7/2008 | Stein | |
| 2009/0292745 A1 | 11/2009 | Bose et al. | |
| 2009/0300139 A1* | 12/2009 | Shoemaker et al. .......... 709/217 |
| 2010/0036892 A1 | 2/2010 | Pandya | |
| 2010/0037301 A1 | 2/2010 | Jones | |

OTHER PUBLICATIONS

OAuth Core 1.0, Dec. 4, 2007, from http://oauth.net/core/1.0/ on Oct. 1, 2011.*

(Continued)

*Primary Examiner* — Jude Jean Gilles
*Assistant Examiner* — Jaren M Means
(74) *Attorney, Agent, or Firm* — Schmeiser, Olsen & Watts; John Pivnichny

(57) ABSTRACT

A method and system for managing redirection for use with a system. The system includes a first webpage and a second webpage. The first webpage is operable to redirect a browser to the second webpage and subsequently, the second webpage is operable to redirect the browser to the first webpage by using a first pre-determined identifier associated with the first webpage. A second identifier associated with a component of the first webpage is assigned. In response to the second webpage redirecting the browser to the first webpage by using the first pre-determined identifier, the first pre-determined identifier is compared against the second identifier to determine whether the second identifier is different from the first pre-determined identifier. In response to a determination that the second identifier is different from the first pre-determined identifier, the browser is redirected to the component of the first webpage by using the second identifier.

9 Claims, 4 Drawing Sheets

OTHER PUBLICATIONS

Austel P et al.; Secure Delegation for Web 2.0 and Mashups; Internet Citation, May 22, 2008; pp. 1-7, XP007910307; Retrieved from the Internet: < URL: http://w2spconf.com/2008/papers/sp4.pdf > [retrieved on Oct. 26, 2009] abstract Section "Introduction, p. 1-2, par 1-3 " Delegation Using OAuth"; p. 3 " Programming Model; p. 3 figure 1.

Mark Atwood et al.; OAuth Core 1.0; Internet Citation, Dec. 4, 2007; XP007910182; Retrieved from the Internet: <URL: http://oauth.net/core/1.0> [retrieved on Oct. 15, 2009] Section 6-7, p. 7-12.

Office Action Response filed (Jul. 30, 2011) for U.S. Appl. No. 12/239,926, First Named Inventor Saurabh Pandya, Confirmation No. 4370.

U.S. Appl. No. 12/238,676, filed Sep. 26, 2008; Confirmation No. 2014; Customer No. 30449.

Final Office Action (Mail Date Oct. 13, 2011) for U.S. Appl. No. 12/239,926, filed Sep. 29, 2008; Confirmation No. 4371.

U.S. Appl. No. 12/239,926, filed Sep. 29, 2008; Confirmation No. 4370.

Office Action (Mail Date Mar. 31, 2011) for U.S. Appl. No. 12/239,926, filed Sep. 29, 2008.

Amendment filed Dec. 13, 2011 in response to Final Office Action (Mail Date Oct. 13, 2011) for U.S. Appl. No. 12/239,926, filed Sep. 29, 2008.

Advisory Action (Mail Date Dec. 30, 2011) for U.S. Appl. No. 12/239,926, filed Sep. 29, 2008.

Notice of Appeal filed Jan. 13, 2012 for U.S. Appl. No. 12/239,926, filed Sep. 29, 2008.

Appeal Brief filed Mar. 9, 2012 for U.S. Appl. No. 12/239,926, filed Sep. 29, 2008.

Notice of Allowance (Mail Date Jun. 13, 2012) for U.S. Appl. No. 12/239,926, filed Sep. 29, 2008.

Office Action (Mail Date Jun. 15, 2012) for U.S. Appl. No. 12/238,676, filed Sep. 26, 2008.

Joy's Production Services; Multi Projector Widescreen [online]; 2008; [retrieved on Jul. 26, 2012]; retrieved from the Internet: <URL: http://www.joys.com/widescreen/multi_projector.shtml>; 1 page.

* cited by examiner

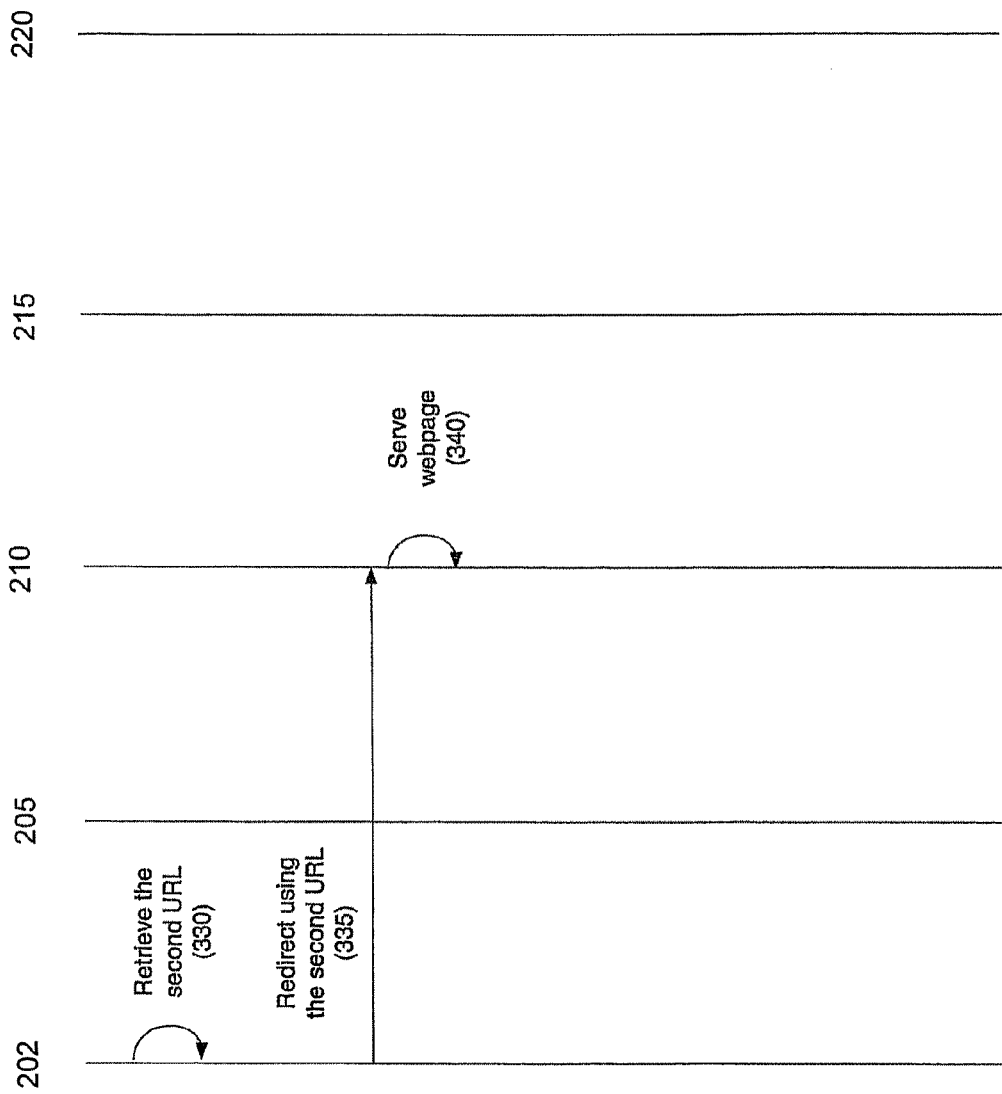

MANAGEMENT OF REDIRECTION

FIELD OF THE INVENTION

The present invention relates to a method and system for managing redirection.

BACKGROUND OF THE INVENTION

In a typical web environment a user uses a browser to access a first website. However, there is a need for an efficient method and system for enabling the first website to access more than one other website.

SUMMARY OF THE INVENTION

The present invention provides a method for managing redirection, for use with a system comprising a first webpage and a second webpage, wherein the first webpage is operable to redirect a browser to the second webpage and subsequently, the second webpage is operable to redirect the browser to the first webpage by using a first pre-determined identifier associated with the first webpage, said method comprising:

assigning a second identifier associated with a component of the first webpage;

comparing, in response to the second webpage redirecting the browser to the first webpage by using the first pre-determined identifier, the first pre-determined identifier against the second identifier in order to determine whether the second identifier is different from the first pre-determined identifier; and redirecting, in response to a determination that the second identifier is different from the first pre-determined identifier, the browser to the component of the first webpage by using the second identifier.

The present invention provides a computer system comprising a processor and a computer readable storage medium, said storage medium containing program code configured to be executed by the processor to implement a method for managing redirection, for use with a system comprising a first webpage and a second webpage, wherein the first webpage is operable to redirect a browser to the second webpage and subsequently, the second webpage is operable to redirect the browser to the first webpage by using a first pre-determined identifier associated with the first webpage, said method comprising:

assigning a second identifier associated with a component of the first webpage;

comparing, in response to the second webpage redirecting the browser to the first webpage by using the first pre-determined identifier, the first pre-determined identifier against the second identifier in order to determine whether the second identifier is different from the first pre-determined identifier; and redirecting, in response to a determination that the second identifier is different from the first pre-determined identifier, the browser to the component of the first webpage by using the second identifier.

The present invention provides a computer program product, comprising a computer readable storage medium having a computer readable program code therein, said computer readable program code comprising an algorithm configured to implement a method for managing redirection, for use with a system comprising a first webpage and a second webpage, wherein the first webpage is operable to redirect a browser to the second webpage and subsequently, the second webpage is operable to redirect the browser to the first webpage by using a first pre-determined identifier associated with the first webpage, said method comprising:

assigning a second identifier associated with a component of the first webpage;

comparing, in response to the second webpage redirecting the browser to the first webpage by using the first pre-determined identifier, the first pre-determined identifier against the second identifier in order to determine whether the second identifier is different from the first pre-determined identifier; and redirecting, in response to a determination that the second identifier is different from the first pre-determined identifier, the browser to the component of the first webpage by using the second identifier.

BRIEF DESCRIPTION OF THE DRAWINGS

The present invention will now be described, by way of example only, with reference to preferred embodiments thereof, as illustrated in the following drawings.

FIGS. 2A and 3B depict a flow chart showing the operational steps involved in a process, in accordance with embodiments of the present invention.

DETAILED DESCRIPTION OF THE INVENTION

The present invention provides an apparatus for managing redirection, for use with a system comprising a first webpage and a second webpage, wherein the first webpage is operable to redirect a browser to the second webpage and subsequently, the second webpage is operable to redirect the browser to the first webpage by using a first pre-determined identifier associated with the first webpage, the apparatus comprising: an assignment component for assigning a second identifier associated with a component of the first webpage; a checker component, responsive to the second webpage redirecting the browser to the first webpage by using the first pre-determined identifier, for comparing the first pre-determined identifier against the second identifier in order to determine whether the second identifier is different from the first pre-determined identifier; and a controller component, responsive to the checker component determining that the second identifier is different from the first pre-determined identifier, for redirecting the browser to the component of the first webpage by using the second identifier.

The present invention provides a method for managing redirection, for use with a system comprising a first webpage and a second webpage, wherein the first webpage is operable to redirect a browser to the second webpage and subsequently, the second webpage is operable to redirect the browser to the first webpage by using a first pre-determined identifier associated with the first webpage, the method comprising: assigning a second identifier associated with a component of the first webpage; comparing, in response to the second webpage redirecting the browser to the first webpage by using the first pre-determined identifier, the first pre-determined identifier against the second identifier in order to determine whether the second identifier is different from the first pre-determined identifier; and redirecting, in response to a determination that the second identifier is different from the first pre-determined identifier, the browser to the component of the first webpage by using the second identifier.

The present invention provides a computer program comprising program code means adapted to perform all the steps of the method above when said program is run on a computer.

The present invention provides an improved method for handling redirect requests.

Figure 1:
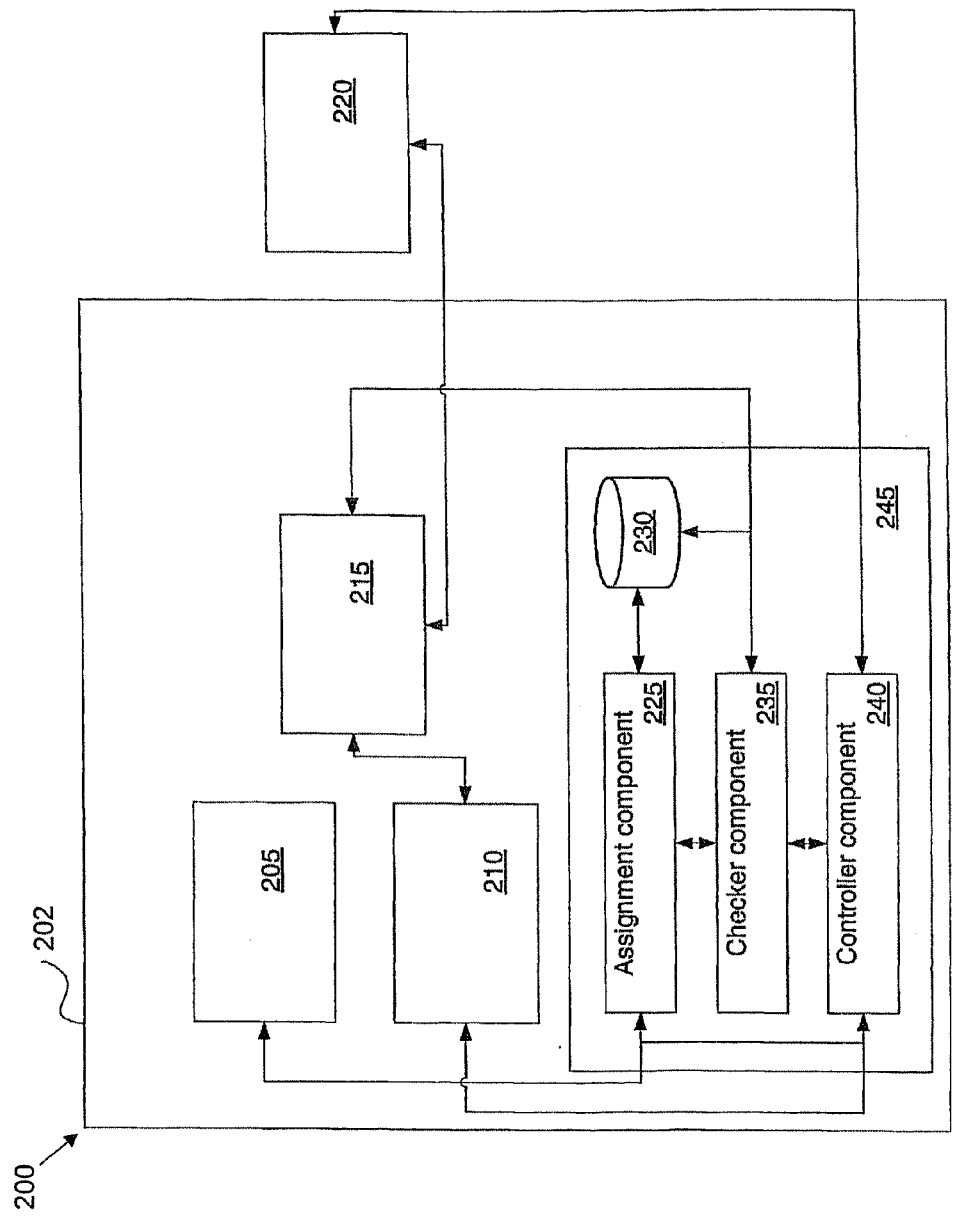
FIG. 1 is a block diagram of a web environment according to the preferred embodiment, in accordance with embodiments of the present invention

With reference to FIG. 1, an environment (200) associated with the present invention is shown and comprises a website (202) operable to communicate with another website which in the example herein is a first social networking website (220). The first social networking website (220) comprises a fourth Universal Resource Locator (URL). It should be understood that social networking websites are described herein for exemplary purposes only.

The website (202) comprises a first servlet (205) having a first URL, a second servlet (210) having a second URL and a third servlet (215) having a third URL.

The website (202) also comprises an apparatus (245) according to the preferred embodiment, wherein the apparatus comprises an assignment component (225) and a checker component (235) each operable to access a storage component (230); and a controller component (240).

Figure 2A:
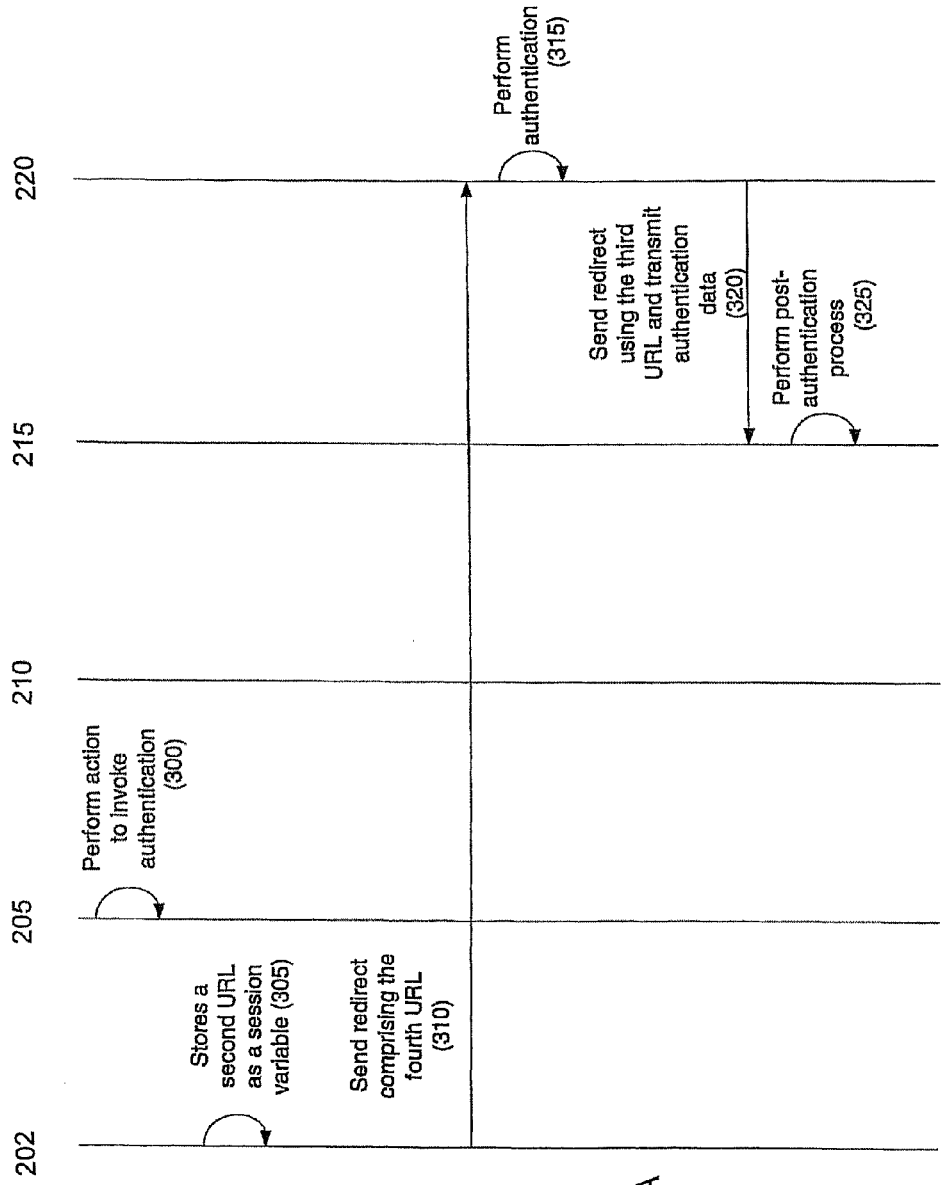

FIGS. 2A and 2B (collectively, "FIG. 2") depict a flow chart showing the operational steps involved in a process, in accordance with embodiments of the present invention.

At step 300, a user uses (e.g. clicks on a button) the first servlet (205) to invoke an authentication mechanism associated with the first social networking website (220).

The user action also invokes a redirect process. In the example herein, the redirect process redirects the user's browser to the first social networking website (220) as will be described in more detail herein.

In order for the first social networking website (220) to redirect the browser back to the website (202), the first social networking website (220) forces the specification in advance of a single pre-determined URL, without any URL parameters. This is an environment constraint due to e.g. the first social networking website (220) having a different web server from the website (202).

In the example herein, the single pre-determined URL is the third URL (associated with the third servlet (215)).

In response to a redirect process being invoked, the first servlet (205) instructs the assignment component (225) to assign a URL (termed herein a "callback" URL) that is more appropriate than the single pre-determined URL.

The callback URL can be input to the assignment component (225) by a developer, a system; the first servlet (205), etc.

In the example herein, the callback URL is the second URL (associated with the second servlet (210)).

In step 205, the assignment component (225) stores the callback URL in the storage component (230). The assignment component (225) may store the callback URL in the storage component (230) as a session variable.

A session is a method of maintaining state between the browser and a web server (in the example herein, wherein the web server is associated with the website (202)). HTTP itself is a stateless protocol as a user can connect and disconnect. For this reason, a "cookie" is typically used to identify a session unique identifier and data (e.g. a session variable) stored in temporary memory (not on disk) associated with the user. The cookie is only valid while the web server is running. Once the session ends (e.g., by the user logging out of the website (202)), the temporary memory is cleared.

Furthermore, in step 310 in response to a redirect process being invoked, the first servlet (205) instructs the controller component (240) to send a redirect request to redirect the user's browser to the authentication mechanism associated with the first social networking website (220). The redirect request comprises the fourth URL associated with the first social networking website (220).

In response to the user's browser being redirected to the first social networking website (220), the user inputs credentials (e.g. a first username and a first password) to the authentication mechanism and at step 315, the authentication mechanism associated with the first social networking website (220) performs authentication of the user.

If authentication is unsuccessful, the first social networking website (220) can display an error message. Alternatively, if the user attempted to navigate back to the website (202) (e.g., by pressing the "back" button on their browser) the user will not be able to access data associated with the first social networking website (220).

In response to a successful authentication, in step 320 the first social networking website (220) redirects the user's browser back to the website (202) by using the single pre-determined URL. More specifically, the user's browser is redirected to the third servlet (215) by using the third URL.

In one embodiment, the authentication mechanism also transmits a first authentication key and the first username to the third servlet (215).

At step 325, the third servlet (215) performs one or more post-authentication processes; e.g., storing the first authentication key for later use to retrieve data associated with the first social networking website (220).

In step 330, the third servlet (215) instructs the checker component (235) to access the storage component (230) to retrieve the session variable. In one embodiment, the checker component (235) parses the session variable to retrieve the associated callback URL (that is, the second URL).

The checker component (235) compares the pre-determined URL with the callback URL in order to determine whether the callback URL is different from the pre-determined URL. In the example herein, if the data associated with the pre-determined URL (e.g., www.website_a.com) has data content which is different from data content associated with the callback URL (e.g., www.website_a.com/servlet_2), the checker component (235) determines that the pre-determined URL is different from the callback URL.

In response to the checker component (235) determining that the pre-determined URL is different from the callback URL, the checker component (235) passes the callback URL to the third servlet (215) and the controller component (240).

In response to receiving the callback URL, the third servlet (215) does not serve any webpages to the user and in step 335 instructs the controller component (240) to redirect the user's browser using the retrieved callback URL (that is, the second URL).

In response, the user's browser is redirected to the second servlet (210) associated with the second URL.

The second servlet (210) can use the stored first authentication key to retrieve data (e.g. a user's contact list; photographs etc.) associated with the first social networking website (220) following successful authentication and serves, in step 340, a webpage to the user comprising the data.

Note, that if the callback URL is the same as the single, pre-determined URL. In one embodiment, the controller component (240) does not initiate a redirect of the user's browser and preferably, the servlet associated with the single, pre-determined URL is operable to serve a webpage.

Advantageously, the specification and use of a callback URL allows for a further redirection to occur in a complex environment e.g. wherein a URL associated with the website (202) that is required following a second redirection can change depending on the context associated with navigation of an external website (e.g. first social networking website (220)) following a first redirection.

Advantageously, the present invention can be used in a complex environment e.g. comprising a website with multiple interfaces wherein the website accesses multiple external websites.

It should be understood that the present invention is superior to other alternatives envisaged by the inventor.

In one scenario, rather than storing a callback URL in the session variable, the required servlet (e.g., the second servlet (210)) can be stored in the session variable. Thus, in this scenario, once the first social networking website (220) redirects the user's browser back to the third servlet (215) using the single, pre-determined URL (e.g. the third URL), control is then passed directly to the second servlet (210). Subsequently, the second servlet (210) can be used to serve webpages.

However, the problem with this scenario is that the second URL of the second servlet (215) can be different to the single, pre-determined URL and the user may not be able to see the second URL.

Thus, for example, if the user e.g. bookmarks the single, pre-determined URL (e.g., http://website-x.com/A) associated with the third servlet (215), if at a later point they attempt to navigate to the webpage identified by the bookmark, they will expect to return to the second servlet (210) (wherein the second servlet (210) has a different URL e.g. http://website-x.com/B).

However, when the user attempts to load the bookmark, most likely, the associated session will have expired, resulting in the session variable (which allows redirection from the third servlet (215) to the second servlet (210)) to also expire. Thus, when the user attempts to load the bookmark http://website-x.com/A, the correct webpage will not be returned as the third servlet (215) rather than the second servlet (210) will be used.

In another scenario, a single servlet can be used by the website such that a callback URL is associated with the single URL of the single servlet. However, the problem with this scenario is that program code associated with the single servlet (effectively, a single endpoint) would be very complex to generate and maintain if the single servlet is responsible for multiple tasks.

This is particularly a problem if HTTP requests are received by the servlet from one or more users as well as e.g. one or more social networking websites (e.g., wherein a social networking website sends redirect requests to the servlet). For example, if a request is received from a social networking website, determining which particular social networking website is making the request and thus which task to perform in response to the request can be complex. This is because a social networking website typically does not provide any identifying parameters with the requests.

It will be clear to one of ordinary skill in the art that all or part of the method of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

Figure 3:
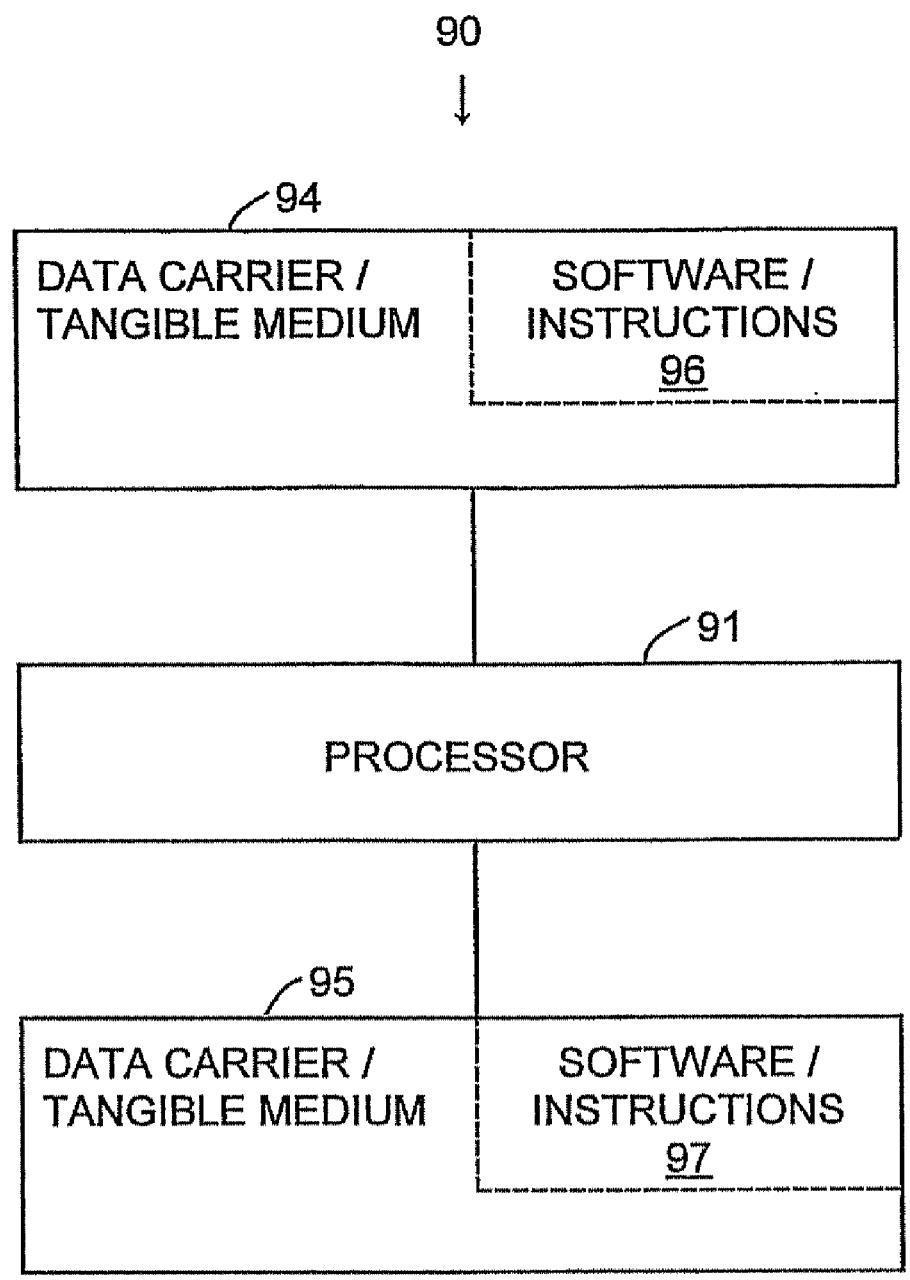
FIG. 3 illustrates a computer system for use with embodiments of the present invention.

FIG. 3 illustrates a computer system 90 for use with embodiments of the present invention.

It will be appreciated that the method and arrangement described above may suitably be carried out fully or partially in program code/instructions/software 97 running on one or more processors 91, and that the software may be provided in the form of one or more computer program elements carried on any suitable data-carrier 95 or 94 such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with the computer system 90. Such an implementation may comprise a series of computer-readable program code/instructions/software 96 either fixed on a tangible storage medium, such as a computer readable storage medium 95 or 94, for example, diskette, CD-ROM, ROM, or hard disk, or transmittable to the computer system 90, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, the present invention may be realized in the form of computer implemented method of deploying a service comprising steps of deploying computer program code operable to, when deployed into a computer infrastructure and executed thereon, cause said computer system to perform all the steps of the described method.

It will be clear to one skilled in the art that many improvements and modifications can be made to the foregoing exemplary embodiment without departing from the scope of the present invention.

What is claimed is:

1. A method for managing redirection, said method comprising:

using, by at least one processor of a computer system, a first servlet of a first website to redirect a browser to a second website for authentication of a user, wherein the first website comprises the first servlet having a first Universal Resource Locator (URL), a second servlet having a second URL, and a third servlet having a third URL;

after said using the first servlet of the first website to redirect the browser to the second website, and after the second website has authenticated the user based on a username of the user and password received by the second website from the user in response to the browser having been redirected to the second website, and after the second website has redirected the browser to the third servlet in response to which a determination is made that the second URL is different from the third URL, said at least one processor receiving at the third servlet an authentication key from the second website; and said at least one processor storing at the third servlet the received authentication key for later use by the second servlet to retrieve data associated with the second website.

2. The method of claim 1, said method further comprising:
said at least one processor establishing a session variable of a session in which the user is logged into the first website, said session variable comprising the second URL;
before the determination was made that the second URL is different from the third URL, said at least one processor storing the session variable in a storage component of the first website; and
said at least one processor ending the session which results in expiration of the session variable.

3. A computer system comprising at least one processor and a computer readable storage device, said storage device containing program code configured to be executed by the at least one processor to implement a method for managing redirection, said method comprising:
said at least one processor using a first servlet of a first website to redirect a browser to a second website for authentication of a user, wherein the first website comprises the first servlet having a first Universal Resource Locator (URL), a second servlet having a second URL, and a third servlet having a third URL;
after said using the first servlet of the first website to redirect the browser to the second website, and after the second website has authenticated the user based on a username of the user and password received by the second website from the user in response to the browser having been redirected to the second website, and after the second website has redirected the browser to the third servlet in response to which a determination is made that the second URL is different from the third URL, said at least one processor receiving at the third servlet an authentication key from the second website; and
said at least one processor storing at the third servlet the received authentication key for later use by the second servlet to retrieve data associated with the second website.

4. The computer system of claim 3, said method further comprising:
said at least one processor establishing a session variable of a session in which a user is logged into the first website, said session variable comprising the second URL;
before the determination was made that the second URL is different from the third URL, said at least one processor storing the session variable in a storage component of the first website; and
said at least one processor ending the session which results in expiration of the session variable.

5. A computer program product, comprising a computer readable storage device having a computer readable program code therein, said computer readable program code configured to be executed by at least one processor to implement a method for managing redirection, said method comprising:
said at least one processor using a first servlet of a first website to redirect a browser to a second website for authentication of a user, wherein the first website comprises the first servlet having a first Universal Resource Locator (URL), a second servlet having a second URL, and a third servlet having a third URL;
after said using the first servlet of the first website to redirect the browser to the second website, and after the second website has authenticated the user based on a username of the user and password received by the second website from the user in response to the browser having been redirected to the second website, and after the second website has redirected the browser to the third servlet in response to which a determination is made that the second URL is different from the third URL, said at least one processor receiving at the third servlet an authentication key from the second website; and
said at least one processor storing at the third servlet the received authentication key for later use by the second servlet to retrieve data associated with the second website.

6. The computer program product of claim 5, said method further comprising:
said at least one processor establishing a session variable of a session in which a user is logged into the first website, said session variable comprising the second URL;
before the determination was made that the second URL is different from the third URL, said at least one processor storing the session variable in a storage component of the first website; and
said at least one processor ending the session which results in expiration of the session variable.

7. The method of claim 1, said method further comprising:
said second servlet using the stored authentication key at the third servlet to retrieve said data associated with the second website, said using the stored authentication key performed by the at least one processor; and
said second servlet serving to the user a webpage comprising the retrieved data, said serving the webpage performed by the at least one processor.

8. The computer system of claim 3, said method further comprising:
said second servlet using the stored authentication key at the third servlet to retrieve said data associated with the second website, said using the stored authentication key performed by the at least one processor; and
said second servlet serving to the user a webpage comprising the retrieved data, said serving the webpage performed by the at least one processor.

9. The computer program product of claim 5, said method further comprising:
said second servlet using the stored authentication key at the third servlet to retrieve said data associated with the second website, said using the stored authentication key performed by the at least one processor; and
said second servlet serving to the user a webpage comprising the retrieved data, said serving the webpage performed by the at least one processor.

* * * * *